(12) United States Patent
Hau

(10) Patent No.: US 11,095,230 B2
(45) Date of Patent: Aug. 17, 2021

(54) AC-TO-DC CONVERSION

(71) Applicant: King Kuen Hau, Hong Kong (HK)

(72) Inventor: King Kuen Hau, Hong Kong (HK)

( * ) Notice: Subject to any disclaimer, the term of this patent is extended or adjusted under 35 U.S.C. 154(b) by 0 days.

(21) Appl. No.: 16/620,501

(22) PCT Filed: Jun. 4, 2018

(86) PCT No.: PCT/IB2018/053965
§ 371 (c)(1),
(2) Date: Dec. 7, 2019

(87) PCT Pub. No.: WO2018/234909
PCT Pub. Date: Dec. 27, 2018

(65) Prior Publication Data
US 2020/0195162 A1     Jun. 18, 2020

Related U.S. Application Data

(60) Provisional application No. 62/521,496, filed on Jun. 18, 2017.

(51) Int. Cl.
*H02M 7/217* (2006.01)
*G05F 1/56* (2006.01)
*H02M 1/44* (2007.01)

(52) U.S. Cl.
CPC ............ *H02M 7/2176* (2013.01); *G05F 1/56* (2013.01); *H02M 1/44* (2013.01); *H02M 7/217* (2013.01)

(58) Field of Classification Search
CPC ...... H02M 7/217; H02M 1/15; H02M 7/2176; H02M 1/44; H02M 2001/0045; G05F 1/56
See application file for complete search history.

(56) References Cited

U.S. PATENT DOCUMENTS

| | | | | |
|---|---|---|---|---|
| 5,181,159 | A * | 1/1993 | Peterson | H02M 1/4225 363/89 |
| 2006/0083038 | A1* | 4/2006 | Lynch | H02M 7/2176 363/127 |
| 2008/0112198 | A1* | 5/2008 | Cheah | H02M 7/2176 363/84 |
| 2014/0043875 | A1* | 2/2014 | Hsing | H02M 7/2176 363/77 |
| 2015/0271894 | A1* | 9/2015 | Torre | H05B 39/047 315/291 |

* cited by examiner

*Primary Examiner* — Peter M Novak

(57) ABSTRACT

A method of AC-to-DC conversion is disclosed, comprising steps of: rectifying an AC voltage to a pulsating DC voltage; coupling the pulsating DC voltage to a capacitor via a switch; coupling an output voltage of the capacitor to a load; monitoring a signal of the load; determining a voltage deviation of the signal of the load from a predetermined reference; in synchronization and in every cycle of the pulsating DC voltage, turning on the switch at a first time instant when the switch is not forward biased and turning off the switch in response to the voltage deviation at a second time instant; whereby the signal of the load is controlled.

21 Claims, 7 Drawing Sheets

AC-TO-DC CONVERSION

BACKGROUND

Field of the Invention

The present invention is directed to method and apparatus for inductor-less AC-to-DC (Alternating Current-to-Direct Current) conversion, in particular for conversion with high efficiency and accuracy.

Description of the Related Art

In the study of electronics it is well known that rectification by a diode or diodes is a basic form of AC-to-DC conversion. The rectified voltage is a DC voltage pulsating at the AC frequency or twice the AC frequency, dependent on whether it is a half-wave or a full-wave rectification. Basic circuits for half-wave and full-wave rectification are shown in FIG. 1 and FIG. 2 respectively. The AC voltage source ACVS supplies a voltage Vin, typically a sinusoidal voltage. The AC voltage is converted to a DC voltage Vo by a rectifier diode D1 as shown in FIG. 1 or by a rectifier bridge comprising the diodes D1, D2, D3 and D4 as shown in FIG. 2. In each case a capacitor C1, a charge storage device, acts as a filter to reduce the magnitude of the ripples of the rectified voltage, since the magnitude is dependent on the values of the capacitor C1 and the load R1. In general, ripple reduction by a capacitor alone is not effective. For DC power supplies in most applications, it is required that the DC voltage be smooth, i.e. substantially free of ripples, and be constant despite of fluctuations of the AC supply and/or change of the load R1. In other words, the DC voltage needs regulation by a voltage regulator such as a unit REGU as shown in a typical illustrative circuit of FIG. 3. The output from the rectifier Vp is regulated by REGU to a smooth and constant voltage Vo, which is further filtered by capacitor C2. The magnitude of Vo is set by a reference voltage Vref.

Many varieties of regulating methods are already developed for DC supplies, broadly categorized into linear and switching approaches. Linear regulators have the advantages of circuit simplicity, fast response, free of EMI (Electromagnetic Interference), etc. However, linear regulators are very inefficient, especially when converting a high AC voltage to a low DC voltage, as often required for powering electronic devices by AC mains supply. Further, linear regulators are not able to raise the voltage levels to higher than the input.

Switching regulators, commonly known as SMPS (Switched Mode Power Supply), enjoy the benefits of high-efficiency, especially when the voltage level be is substantially lowered or raised, or when the output polarity be is inverted. Unfortunately this can only be achieved through a much more complicated circuitry, and often at high costs. EMI due to high frequency switching is also an inherent problem.

Yet in the prior art there is a class of switching AC-to-DC converters which do not require switching at high frequencies as the SMPS does, and not even the use of inductive components. These converters enjoy the benefits of simple circuitry, small footprint and low cost. The basic principle of operation of these converters is illustrated by the block diagram of FIG. 4A. Note that this circuit differs from the circuit of FIG. 2 by an extra controllable switch S1 (and also a bleeding resistor Rb to be which will be discussed). In other words, if the switch S1 is kept permanently on, the circuit works as a full-wave rectifier in just the same way as the circuit of FIG. 2. There is no regulation performed as the rectified voltage Vp is connected directly to the output Vo, and current is flowing directly from the rectifier to the output. However, it is not difficult to visualize that by opening the switch for part of the period when the current should be flowing, i.e. when voltage Vp is higher than voltage Vo, the average output voltage can be reduced. By controlling the opening time through the application of a control signal Sigc, voltage reduction by zero to 100% is possible.

Note that a bleeding resistor Rb is placed at the output of the rectifier. This is often required to discharge any parasitic capacitance associated with the rectifier diodes D1 to D4, the switch S1, and any other components electrically coupled to the output terminal of the rectifier. The presence of the parasitic capacitance distorts the waveform of the pulsating DC voltage Vp as and when the switch S1 is opened. This is not desirable as the control signal Sigc must be synchronized to the pulsating DC voltage Vp. Distortion of Vp leads to failure in synchronization.

For implementation of the converter shown in FIG. 4A, a semiconductor switch, such as a MOSFET Q1 as shown in FIG. 4B, is often deployed.

Commonly known as inductorless AC-to-DC converter, many different designs under this class have been disclosed, such as those by U.S. Pat. Nos. 4,685,046, 5,307,257, 6,169,391, 8,451,627 and 9,374,018. All these designs share a common structure as illustrated by FIGS. 4A and 4B, wherein the charging of a capacitor by a rectified pulsating DC voltage is through a controlled switch. The voltage output of the converter is regulated by turning on and off of the switch according to signal voltages from either the input or the output of the switch, or both. FIG. 4C is a block diagram showing one of the control schemes of the switch. A signal Sigl of the load PWLD, which may be for example voltage across the load, or current through the load, or even the power of the load, is compared to a predetermined voltage Vref by the comparator COMP. When Sigl is higher than Vref, output Sigc of COMP will turn low and turn off the switch S1, and will hence stop charging C1 from Vp. Conversely, when Sigl is lower than Vref, Sigc will turn high, turning the switch S1 on, charging capacitor C1 as soon as Vp is higher than the voltage Vc1 of the capacitor C1.

As a matter of fact however, due to line noise or drift of the characteristics of the components, switch timing might not be repeated exactly cycle by cycle, leading to uneven or missing current pulses of capacitor charging. This leads to enlarged ripples riding on the output DC voltage. As shown by the waveform diagram in FIG. 4D, signal curve Vp is the pulsating DC voltage, curve Vc1 is the voltage across the capacitor C1, which is also the voltage applied to the load and named signal Sigl, and curve Sigc is the control signal of the switch S1. If for some reason, C1 is charged up a bit higher at time t4, such that in the following cycle Sigl is not low enough to generate a Sigc pulse to turn on the switch S1. Vc1 will therefore fall by two cycles until it is charged again at t6. Because of the missing of charging C1 by one cycle, the ripple on Vc1 is raised to twice as big as the normal, as labelled in the waveform diagram by 2X and X after and before t4 respectively. Note that the problem cannot be solved by larger capacitance values of C1, as larger capacitance of C1 might actually lead to even more cycles of "missing fire".

Therefore, these converters are not able to offer precise voltage or current regulation, even if large capacitors are used. Further, for the same reason, it has been commonly recommended that the output voltage of a converter of this kind be further regulated by an extra switching or linear regulator. This will of course lead to designs compromised in energy efficiency and manufacturing cost.

It is the goal of the present invention to develop new methods of inductorless AC-to-DC conversion with high efficiency, high accuracy, low EMI and low-cost of implementation.

SUMMARY OF THE INVENTION

As already pointed out that unsynchronized switching in the inductorless AC-to-DC converter may lead to unsteady charging and hence high ripples in the output. To address the problem, means for synchronization will be developed for switch control.

In one embodiment of the present invention, a control method for AC-to-DC conversion is disclosed, comprising steps of rectifying an AC supply voltage to a pulsating DC voltage; coupling the DC voltage to a capacitor via a switch; detecting zero-crossing of the supply voltage; turning on the switch at the zero-crossing; turning off the switch after a controllable on-time; the controllable on-time is set inversely proportional to an output current of the AC-to-DC conversion, whereby the output current is regulated to a predetermined value.

In another embodiment of the present invention, an AC-to-DC converter is disclosed, comprising a means to rectify an AC supply voltage to a pulsating DC voltage; at least one switch coupling the DC voltage to a capacitor; a detection means to detect zero-crossing of the voltage; wherein the switch is turned on at the zero-crossing, then turned off after a controllable on-time, and kept off till the next zero-crossing; the controllable on-time being set by a timing pulse from a voltage controlled pulse generator, comprising: a sawtooth signal generator synchronized to the zero-crossing; a comparator; wherein the sawtooth signal is compared to the deviation of an output voltage of the AC-to-DC converter from a predetermined reference; whereby a pulse width inversely proportional to the output voltage is generated, whereby the output voltage is regulated to a predetermined value.

In another embodiment of the present invention, a charge pump deployed as an AC-to-DC converter is disclosed, comprising a rectifying means to convert an AC supply to a pulsating DC voltage; a switch coupling the rectified voltage to a capacitor; a detection means to detect zero-crossing of the voltage; wherein the switch is turned on at the zero-crossing, then turned off after a controllable on-time, and kept off till the next zero-crossing; the controllable on-time being set by a timing pulse from a voltage controlled pulse generator, comprising: a sawtooth signal generator synchronized to the zero-crossing; a comparator; wherein the sawtooth signal is compared to the deviation of an output power of the charge pump from a predetermined reference; whereby a pulse width inversely proportional to the output power is generated, whereby the output power is regulated to a predetermined value.

In the above embodiments switching is synchronized to the zero-crossing of the AC supply voltage. In this regard, special zero-crossing detection circuits are required. As yet for an embodiment of the present invention, switching is synchronized to the pulsating DC voltage directly, without the need of a zero-crossing detector. The method disclosed is comprising steps of rectifying an AC supply voltage to a pulsating DC voltage; coupling the pulsating DC voltage to a capacitor via a switch; coupling a voltage across the capacitor to a load; in every cycle of the pulsating DC voltage, turning on the switch at a first instant when the switch is not forward-biased, and turning off the switch at a second instant when the pulsating DC voltage is higher than the deviation of the output voltage of conversion to a reference value, whereby the output voltage is regulated to a predetermined value.

To further improve the precision of voltage regulation, an embodiment of the present invention is a method of AC-to-DC conversion comprising the steps of rectifying an AC supply voltage to a pulsating DC voltage; coupling the pulsating DC voltage to a capacitor via a switch; coupling a voltage across the capacitor to a linear regulator; in every cycle of the pulsating DC voltage, turning on the switch at a first instant when the switch is not forward-biased, and turning off the switch at a second instant when the pulsating DC voltage is higher than the sum of a peak-to-valley ripple voltage across the capacitor, an anticipated voltage-drop across the linear regulator, and a target output voltage of the linear regulator.

Alternatively, for improvement of the precision of voltage regulation, another embodiment of the present invention disclosed is a method of AC-to-DC conversion comprising the steps of rectifying an AC supply voltage to a pulsating DC voltage; coupling the pulsating DC voltage to a capacitor via a switch; coupling a voltage across the capacitor to a linear regulator; in every cycle of the pulsating DC voltage, turning on the switch at a first instant when the switch is not forward-biased, and turning off the switch at a second instant when the pulsating DC voltage is higher than a threshold, the threshold being an amplified value of a target output voltage plus an anticipated voltage-drop of the linear regulator minus the valley voltage at the input of the linear regulator.

BRIEF DESCRIPTION OF THE DRAWINGS

With the foregoing in view, as other advantages as will become clear to those skilled in the art to which this invention relates as this patent specification proceeds, the invention is herein described by reference to the accompanying drawings forming a part hereof, which includes descriptions of some typical preferred embodiments of the principles of the present invention, in which.

DETAILED DESCRIPTION OF THE INVENTION

Figure 1:
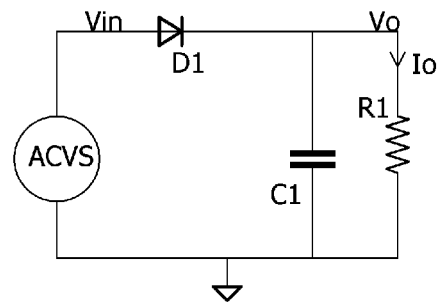
FIG. 1 A half-wave rectifier as an AC-to-DC converter (Prior art)
Figure 2:
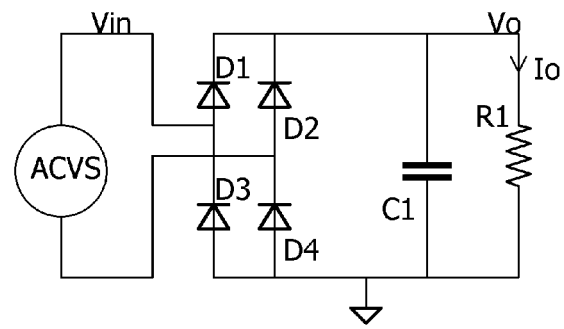
FIG. 2 A full-wave rectifier as an AC-to-DC converter (Prior art)
Figure 3:
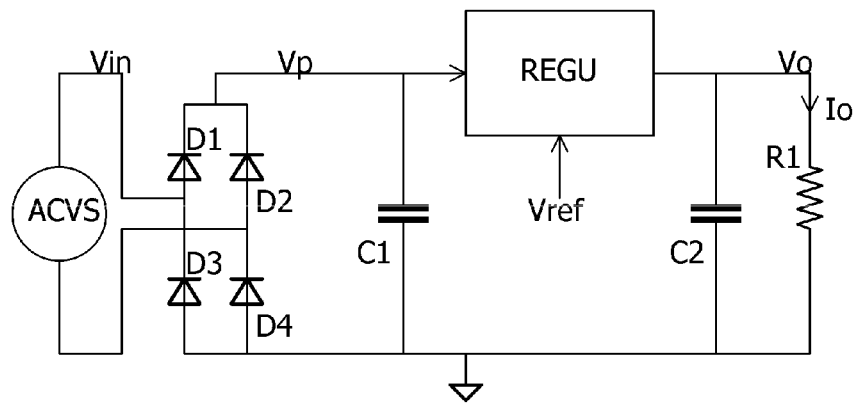
FIG. 3 An AC-to-DC converter with regulation (Prior art)
Figure 4A:
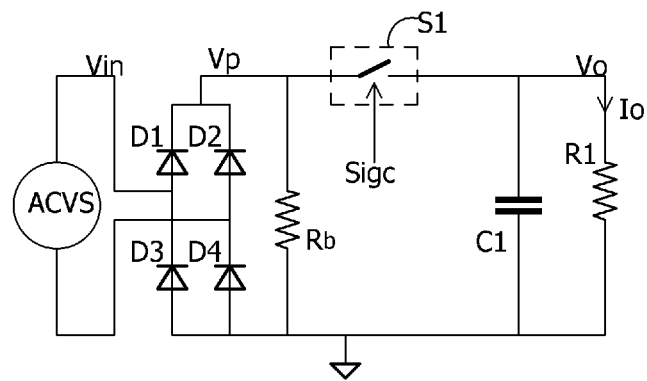
FIG. 4A A controlled AC-to-DC converter (Prior art)
Figure 4B:
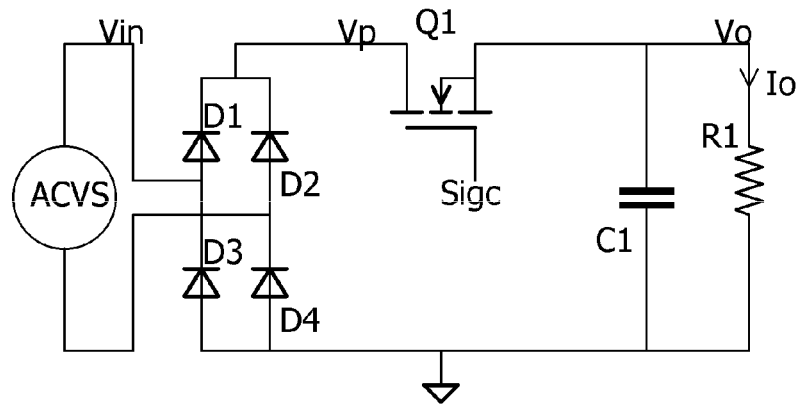
FIG. 4B A controlled AC-to-DC converter switching (Prior art)
Figure 4C:
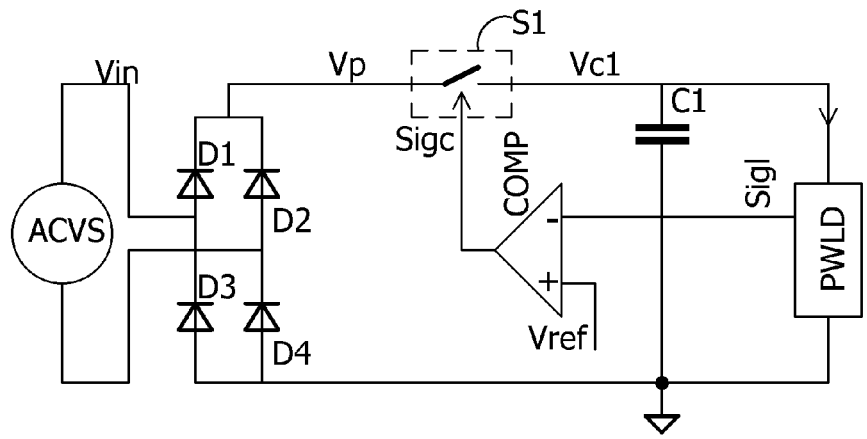
FIG. 4C A controlled AC-to-DC converter implementation (Prior art)
Figure 4D:
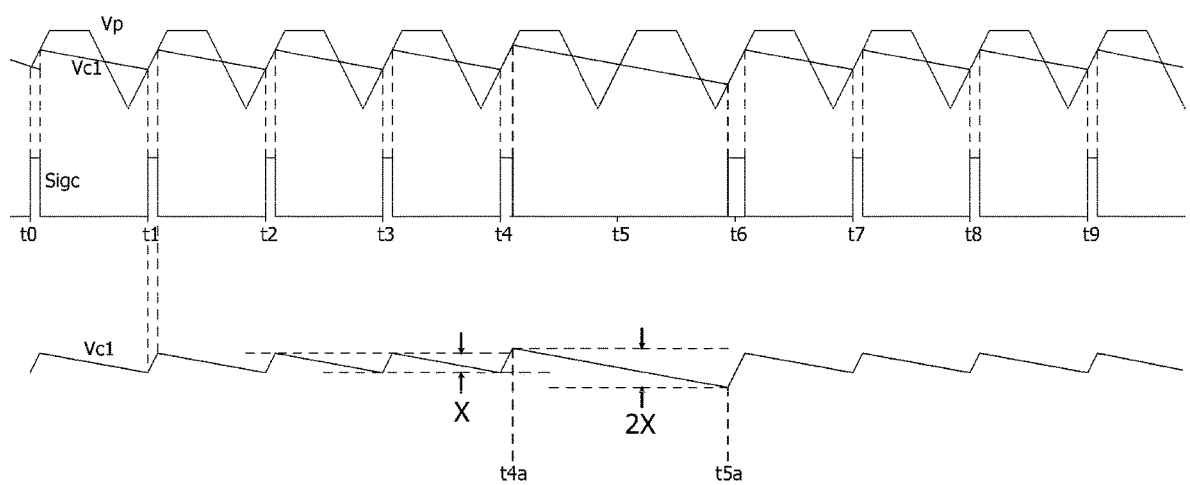
FIG. 4D Waveforms of a controlled AC-to-DC converter (Prior art)

Continuing on the discussion of the inductorless converter of FIG. 4A, it is noted that if the switch is turned on at the instant when Vp is higher than Vo, an abrupt change of capacitor voltage Vo will induce a high current surge through the switch. This is not desirable as a high current surge means big stress on the switch, high dissipation loss as well as high EMI. On the other hand, when the switch is turned off when a current is flowing through the switch, charging up the capacitor C1 and driving the load, the current will be lowered to zero immediately without any ill effect. To avoid the current surge, the switch must be turned on when it is not yet forward biased. In other words, it should be turned on when it is zero biased, or when the corresponding rectifiers in series with the switch is reverse biased. This also implies that no current will flow immediately when the switch is turned on. Therefore by turning on say at zero-crossing of the voltage across the switch S1, then turning off the switch after a certain period, and keeping the switch off till the next zero-crossing, the output voltage is controlled with minimum switching loss.

It is noted that prior to the zero-crossing of the voltage across the switch S1, the instantaneous voltage of the AC voltage Vin is lower than that of the output voltage Vo. Turning on the switch S1 will not lead to conduction of current as the switch S1 in series with the diodes is not forward biased. As long as the switch S1 is turned on before it is forward-biased, current will not flow until the AC input voltage is increasing sinusoidally from zero to a voltage higher than the output voltage Vo plus a conduction threshold voltage of the rectifier diodes. Therefore the zero-crossing of the AC voltage may be adopted as the time to turn on the switch S1 so as to avoid the problem of high EMI and high dissipation loss. In fact, this is a better option to be explained later that it will be easier to detect the zero-crossing of the AC voltage as a time marker than that of the post-rectification voltage, say that of the voltage across the switch S1.

Figure 5:
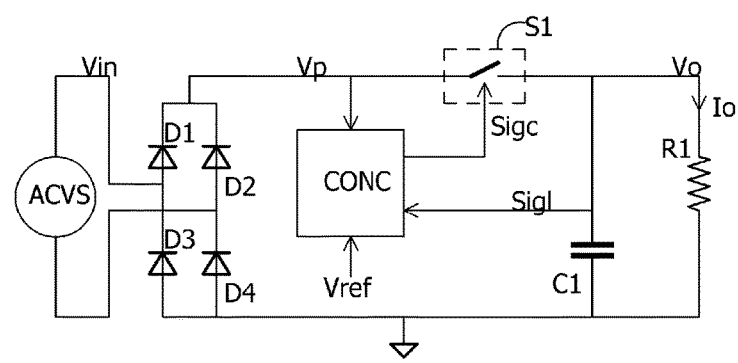
FIG. 5 A controlled AC-to-DC converter as an embodiment of the present invention FIG. 6A AC-to-DC conversion synchronized to zero-crossing of switch voltage FIG. 6B AC-to-DC conversion synchronized to zero-crossing of the AC supply FIG. 7A A charge pump (Prior art)

FIG. 5 shows the operation principle of a regulated AC-to-DC converter as one of the embodiments of the present invention. Voltage regulation is performed through the switch S1 under the control of a controller module CONC. The control signal Sigc is generated by the controller module according to the signals Vp from the rectifier bridge formed by rectifier diodes D1, D2, D3 and D4, Sigl a signal of the load, which is the output voltage Vo in this case, and a predetermined reference voltage Vref. Details of operation of the controller module is to will be explained with reference to FIG. 6A.

Figure 6A:
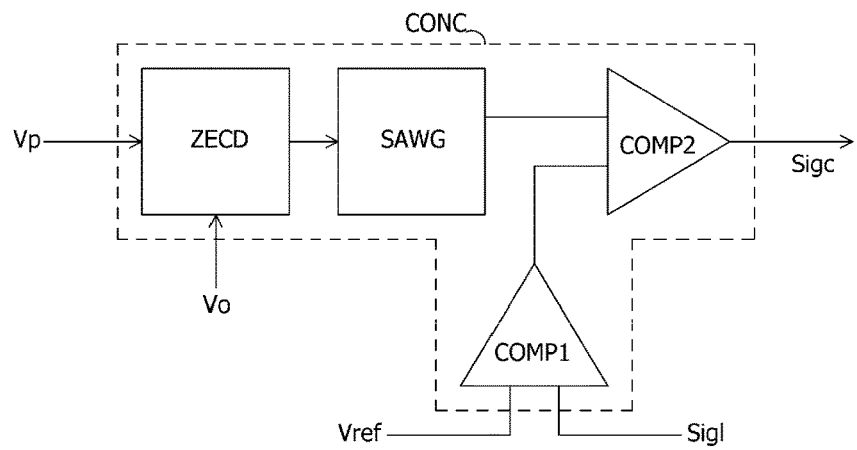
Figure 6B:
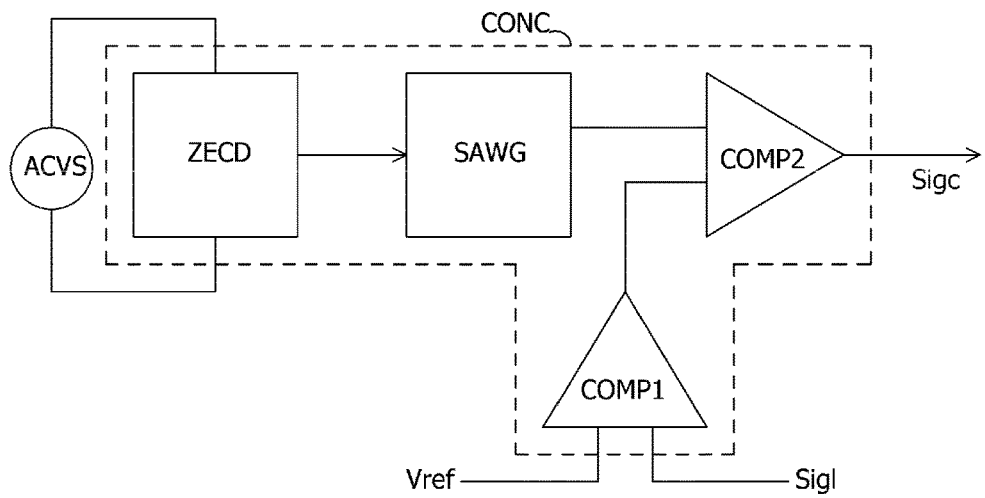

FIG. 6A is a block diagram of the controller module CONC. As shown, the pulsating DC voltage Vp from the rectifier and the output voltage Vo across C1, are applied to a zero-crossing detector ZECD. The difference of the voltages Vp and Vo is a voltage driving the switch S1. The detector ZECD generates a marker signal at every zero-crossing of the voltage driving the switch S1. Alternatively, as the pulsating DC voltage is in synchronization with the AC supply voltage, the marker signal can be obtained directly from the zero-crossing of the AC voltage. The arrangement is shown by the block diagram of FIG. 6B. When the AC voltage from the source ACVS is zero, the voltage driving the switch will also be zero such that turning on the switch S1 at this moment will not lead to abrupt change of the capacitor voltage and any resultant current surge. Synchronized to this marker signal, a sawtooth signal (as a typical ramping signal) is generated by a generator SAWG. A circuit signal Sigl, which is the output voltage Vo of the AC-to-DC converter as shown in FIG. 5, is compared to a predetermined voltage Vref by a comparator COMP1. The difference is compared to the sawtooth signal from the generator SAWG by a comparator COMP2. An output Sigc from COMP2 is generated with a pulse width inversely proportional to the deviation of the signal Sigl, i.e. Vo, from the reference Vref. Therefore, the higher the output voltage Vo, the higher the deviation, the lower the pulse width of Sigc will be. In effect, with the switch S1 conducting current for a shorter period of time within each switching cycle, the output voltage Vo is regulated by negative feedback.

Note that the accuracy of regulation depends on the gain of the comparator COMP1. For a relaxed accuracy, the reference Vref may be set to zero and the gain of COMP1 may be set from unity to any large value. When Vref is zero and the gain is unity, COMP1 is redundant that Sigl may be connected directly to the input of COMP2.

In yet other embodiments of the present invention, the Sigl is representative of an output current of the AC-to-DC converter. By a similar operation principle for voltage regulation as presented above, the output current of the converter is regulated.

Figure 7A:
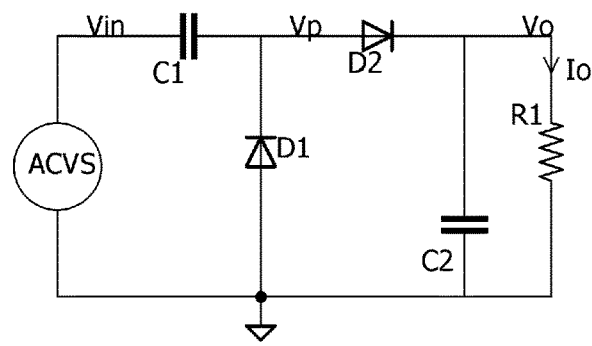
FIG. 7B A regulated charge pump as an embodiment of the present invention
Figure 7B:
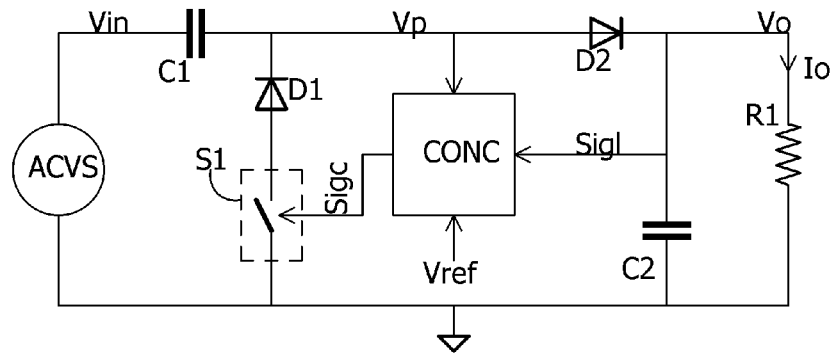

When an output voltage Vo is higher than the peak of the AC supply, a voltage-multiplying charge pump such as the one shown in FIG. 7A may be deployed. FIG. 7B shows a controlled charge pump as an embodiment of the present invention. This is a circuit of a common voltage-doubling charge pump but with the addition of a switch S1 controlled by a controller module CONC. A maximum output voltage Vo, achieved with switch S1 permanently shorted, is the peak to peak of the AC voltage Vin. Therefore, by controlling the on-time of the switch S1, the output voltage or output current of the charge pump can be controlled in a similar way by a control module CONC as explained with reference to FIG. 6A. In this case, the detection of zero-crossing of the voltage across the switch may be performed on the rectified voltage Vp with reference to the output voltage Vo. Alternatively, instead of controlling the current through the diode D1, the switch S1 may be connected in series with the diode D2.

In detecting the zero-crossing of the voltage across the switch, there is generally a difficulty due to the presence of parasitic capacitance associated with the switch. Since the switch is always in a post-rectification circuit, charge will be built up in the capacitance and the voltage may not return to zero in time as the AC voltage drive is cycled to zero, effectively making the zero-crossing "buried". In fact, by the definition of rectification, the rectified voltage will never "cross" the zero level for however small the associated parasitic capacitance. Therefore "zero-crossing" for rectified circuits is understood to have just the meaning of "close to zero" and is therefore never an exact definition.

However no such difficulty exists for the AC voltage even there is some parasitic capacitance, as the AC voltage is always cycled between positive and negative values. The zero-crossing is always clearly manifested. Therefore the detection of the zero-crossing of the AC voltage can be performed more accurately than that of the rectified voltage.

It implies that the circuit control synchronized to this zero-crossing will be steady and jitter-free.

Figure 8A:
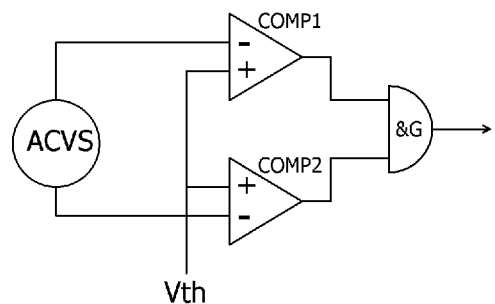
FIG. 8A Zero-crossing detector 1 for AC supply voltage

The operation principle of a zero-crossing detector for AC voltage as an embodiment of the present invention is illustrated in the diagram of FIG. 8A. As deployed for the controller of FIG. 6B, the detector has two input terminals, each coupled to one of the two terminals of the AC voltage supply ACVS, irrespective of the circuit arrangement of the rectification circuit, which is not shown. The voltage of each terminal, with reference to the common ground of the post-rectification circuit, is compared separately by comparators COMP1 and COMP2 to a reference voltage Vth. Vth is taken as a zero threshold, i.e. only a voltage below this is considered "zero". In principle, Vth may be set to zero as the AC voltage is cycling between positive and negative values. However a small positive value is recommended to take care of possible line noise and deficiency of the comparators. For zero-crossing detection, it is required that the voltages of both terminals of ACVS are simultaneously "zero". Therefore as shown the outputs of the two comparators COMP1 and COMP2 are logically operated by an AND-gate &G to generate a zero-crossing marker signal when both voltages are "zero". This marker signal will be a narrow pulse at the zero-crossing of the AC supply.

Figure 8B:
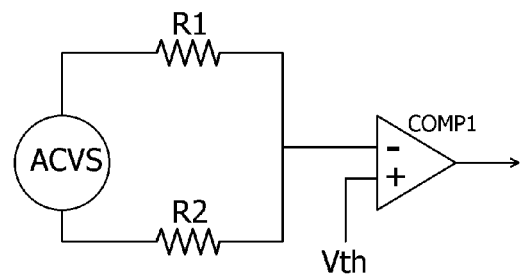
FIG. 8B Zero-crossing detector 2 for AC supply voltage

When the voltages of both terminals of ACVS are simultaneously "zero", the sum of the two will also be "zero". By this reasoning, a simplified circuit for zero-crossing detection for AC voltage is disclosed here as an embodiment of present invention. As shown in FIG. 8B, the two voltages from ACVS are summed by two resistors R1 and R2 of equal impedance. In effect, half of the sum of the two voltages is compared to the threshold Vth by the comparator COMP1, generating a zero-crossing marker signal when both voltages are "zero". Compared to the circuit of FIG. 8A, the value of Vth will be halved to get the same pulse width of the zero-crossing marker pulse.

It should be noted for practical implementation of either circuit of FIG. 8A or FIG. 8B, the generally high voltage of the supply ACVS is incompatible with the generally low voltage level of operation for the comparators. Voltage scaling and/or level shifting is hence required but not shown for clarity of illustration. In fact the same note applies to all the circuits in this specification when a controller is required to control devices operating at high voltages.

Figure 9:
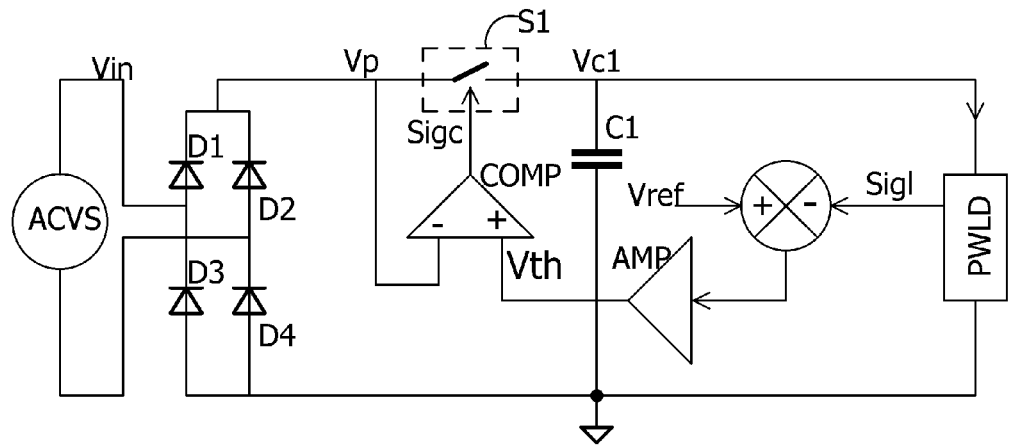
FIG. 9 An AC-to-DC Converter synchronized to the pulsating DC voltage

In the above discussion switching is synchronized to the zero-crossing of the AC supply voltage. Special zero-crossing detection circuits are deployed. Alternatively, switching can be made synchronized to the rectified pulsating DC voltage. An AC-to-DC circuit block diagram in FIG. 9 is used to illustrate this approach. As shown, the pulsating DC voltage Vp is coupled to a capacitor C1 through the switch S1, which is controlled by a control signal Sigc from the comparator COMP. The output voltage of the converter Vc1 is coupled to a load PWLD. A signal Sigl from the load, representative of an electrical parameter under control, such as the load voltage, load current, or load power, is subtracted from a predetermined reference voltage Vref to generate a threshold voltage Vth. This threshold voltage sets an upper ceiling of the pulsating DC voltage that will be coupled to the capacitor C1 through the switch S1. Whenever Vp reaches a value equal to or larger than Vth, the output of the comparator COMP will change state to turn off the switch S1. Now suppose signal Sigl rises, signal Vth will be lowered so that C1 will be charged to a lower voltage by the pulsating DC voltage. This will lead to a lower drive to the load PWLD hence Sigl will be lowered. Thus a negative feedback loop is in force and load signal Sigl is controlled to close to the value of Vref.

Note that in operation when the switch is turned on, the capacitor is charged up in a short time and switch is turned off. The capacitor will continue to supply current to the load, leading to a drop of voltage till the next cycle of charging. This shows how a ripple voltage in the shape of sawtooth is formed. To get rid of the ripples without using excessively large filter capacitors, an embodiment of the present invention is disclosed here with reference to the block diagram of FIG. 10. As shown, the load to the converter is a regulator REGU itself loaded by a load R1. The regulator can be either a linear or switching regulator. However it will be explained in the following that a linear regulator will be a better choice even for the sake of efficiency.

By regulation, the voltage output Vo is kept to a preset target value Vref (or a scaled up value of).

Figure 10:
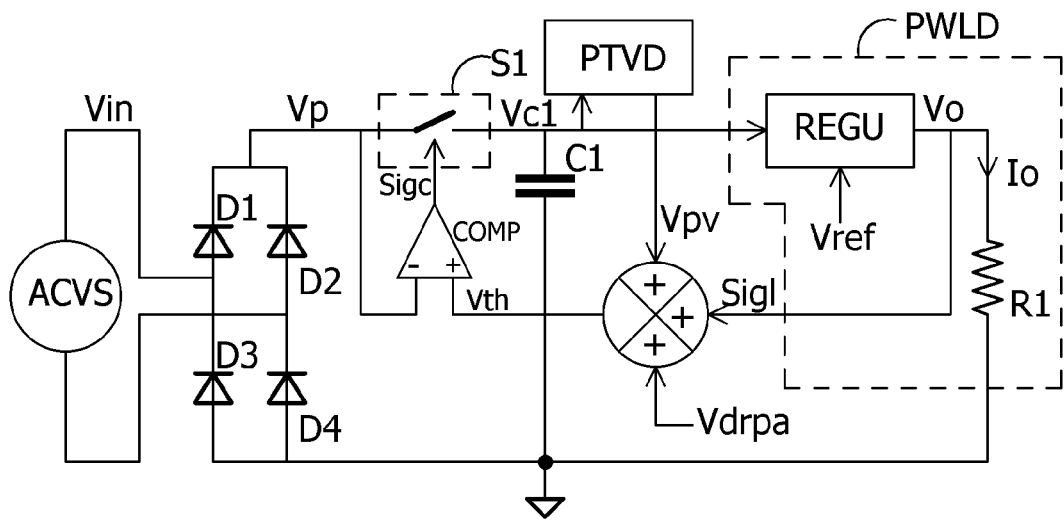
FIG. 10 AC-to-DC converter 1 with a linear regulator

For a high efficiency of the regulator, what is needed is to have a small difference between the voltages Vc1 and Vo, i.e. low voltage-drop across the regulator REGU. This is achieved by controlling Vc1 to a value just high enough to drive the regulator REGU, i.e. just to keep a small but enough voltage-drop across the regulator. As shown in FIG. 10, a peak-to-valley ripple voltage Vpv as detected by a Peak-to-Valley detector PTVD, a reference voltage Vref as a load signal voltage Sigl, and a small voltage-drop Vdrpa anticipated for the linear regulator REGU is summed up as a threshold voltage Vth. This threshold voltage sets a ceiling value of the pulsating DC voltage Vp that will be coupled to the capacitor C1 through the switch S1. Whenever Vp reaches a value higher than Vth, the output of the comparator COMP will change state to turn off the switch S1. Consequently the voltage Vc1 is controlled to have a peak voltage of Vc1p, and a valley of Vc1v, and hence a peak-to-valley ripple voltage Vpv=Vc1p−Vc1v.

Therefore, Vc1 is controlled to a level such that its peak value Vc1p is no higher than the threshold voltage Vth, or in other words, the valley value Vc1v is no higher than the set Vdrpa plus the output voltage Vo of the linear regulator. The dissipation on the regulator is then the highest at (Vc1p−Vo).Io when the voltage at Vc1 is at the peak, and the lowest when (Vc1v−Vo).Io when the voltage at Vc1 is at the valley, i.e. when Vdrpa.Io=(Vc1v−Vo).Io. If Vdrpa is made small by design, the dissipation can be made will be small. Therefore there is no incentive to use a switching regulator as REGU, as its efficiency is not likely higher than a linear regulator with a low dropout.

Figure 11:
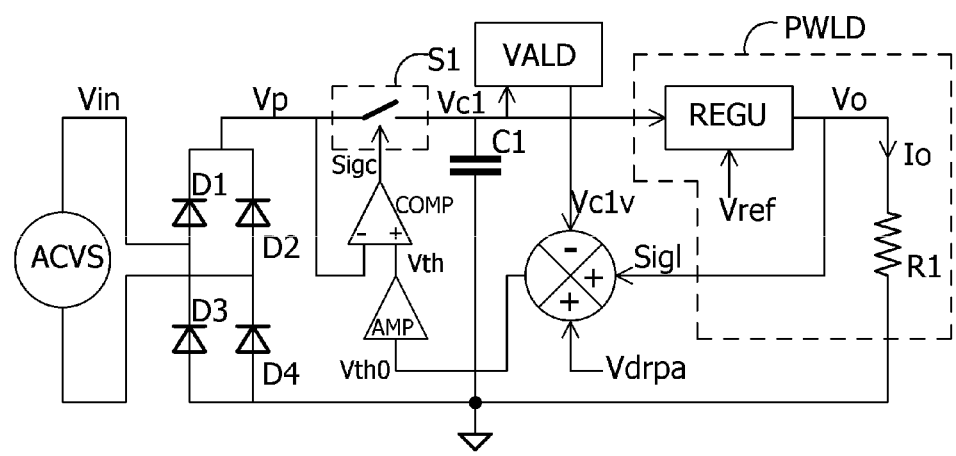
FIG. 11 AC-to-DC converter 2 with a linear regulator

Alternatively, an embodiment of the present invention shown by the block diagram of FIG. 11 will obtain the same result as that by FIG. 10. A valley detector VALD is deployed to detect the valley voltage Vc1v of the capacitor voltage Vc1. A signal Vth0 is obtained by subtracting Vc1v from the sum of the output voltage Vo as a load signal voltage Sigl and a small voltage-drop Vdrpa anticipated for the linear regulator REGU. Vth0 is amplified by AMP to Vth as the threshold value for comparison with the pulsating DC voltage Vp. The switch S1 will be turned off when Vp is higher than Vth. This completes the negative control loop so that the valley voltage Vc1v will be made close or equal to a value Vdrpa above the output voltage Vo of the linear regulator. Similar to the above case, Vdrpa is made small by design for low dissipation on the linear regulator.

Figure 12:
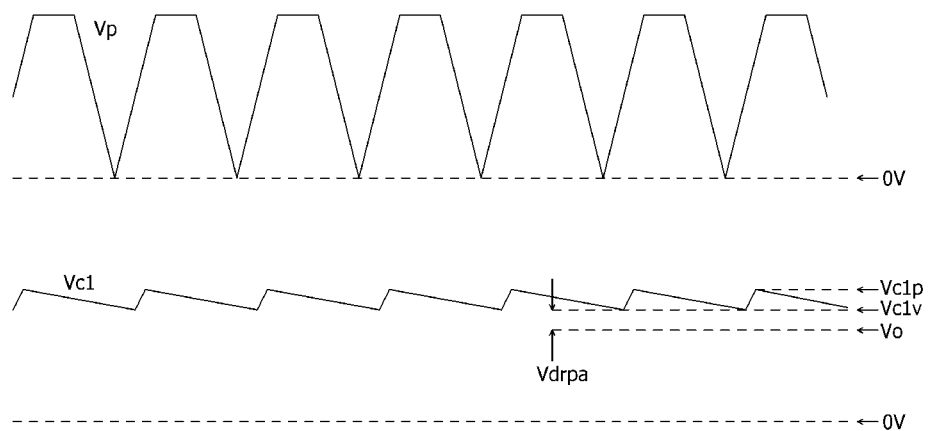
FIG. 12 Waveforms of an AC-to-DC converter followed by a linear regulator

FIG. 12 is a waveform diagram showing the relations between the pulsating DC voltage Vp, and the voltage Vc1 across C1. Note the ripple with the peak at Vc1p and the valley at Vc1v, the anticipated voltage-drop Vdrpa across the linear voltage regulator REGU and the voltage output Vo of the regulator. Note that the valley voltage Vc1v is controlled to keep a value equal to the sum of voltage output Vo and the voltage-drop Vdrpa.

Although the invention and its advantages have been described in detail, it should be understood that various changes, substitutions, and alterations can be made without departing from the spirit and scope of the invention as described. For example, the specific implementation of the inventive circuits may be varied from the examples provided here while still within the scope of the present invention. As some more examples, specified directions of current flow, polarities of the voltages may be reversed, the polarities or electrodes of a semiconductor device may be interchanged, voltage and current levels may be scaled or shifted up or down. Further, by the duality property of electrical circuits, the roles of current and voltage, impedance and admittance, inductance and capacitance, etc., can be interchanged. In essence, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the invention.

The invention claimed is:

1. A method of AC-to-DC conversion, comprising the steps of: rectifying an AC voltage to a pulsating DC voltage; coupling the pulsating DC voltage to a capacitor via a switch as a first regulator; coupling a voltage of the capacitor to a first load; determining a deviation of a signal of the first load from a predetermined reference; at a first instant of a cycle of the pulsating DC voltage turning on the switch when the switch is not forward biased; and at a second instant of the cycle turning off the switch when the deviation is lower than a ramping signal, wherein the ramping signal is initiated at zero crossing point of the pulsating DC voltage and level of the ramping signal at the second instant is higher than that at the first instant; whereby the signal of the first load is regulated.

2. The method of claim 1, wherein the signal of the first load is representative of a load voltage, or a load current, or a load power.

3. The method of claim 1 wherein the ramping signal is synchronized to zero-crossing detection of the AC voltage.

4. The method of claim 3, wherein zero-crossing detection is comprising the steps of: monitoring a voltage at each of the two input terminals of the AC voltage; comparing the voltages to a predetermined value; determining when both voltages are below the predetermined value.

5. The method of claim 3, wherein zero-crossing detection is comprising the steps of: determining the sum of the voltages at the two input terminals of the AC voltage; comparing the sum to a predetermined value; determining when the sum is below the predetermined value.

6. The method of claim 3, wherein the ramping signal is a sawtooth signal.

7. The method of claim 1, wherein the ramping signal is generated by scaling the pulsating DC voltage.

8. The method of claim 1, further comprising the step of regulation by a second regulator coupled between the capacitor and a second load; wherein a minimum of the voltage of the capacitor is controlled equal the output voltage of the second regulator plus a predetermined headroom voltage.

9. The method of claim 8, further comprising the steps of: determining a peak-to-valley ripple amplitude of the voltage of the capacitor; determining a threshold voltage which is the sum of the output voltage of the second regulator, a predetermined headroom voltage of the second regulator and the peak-to-valley ripple amplitude; wherein the threshold voltage is the deviation.

10. The method of claim 8, further comprising the steps of: determining a valley value of the voltage of the capacitor, determining an error signal being a sum of the output voltage of the second regulator and a predetermined headroom voltage of the second regulator minus the valley value; amplifying the error signal; wherein the amplified error signal is the deviation.

11. The method of claim 8, wherein the second regulator is a linear regulator.

12. An AC-to-DC converter, comprising: a rectifier converting an AC voltage to a pulsating DC voltage; a capacitor coupled to the pulsating DC voltage via a switch as a first regulator; a first load coupled to a voltage of the capacitor; a first comparator to determine a deviation of a signal of the first load from a predetermined reference; a second comparator to determine when a ramping signal is higher than the deviation; and wherein the switch is turned on at a first instant of a cycle of the pulsating DC voltage when the switch is not forward biased and the switch is turned off at a second instant of the cycle when the ramping signal is higher than the deviation; wherein the ramping signal is initiated at zero crossing point of the pulsating DC voltage and level of the ramping signal at the second instant is higher than that at the first instant; whereby the signal of the first load is regulated.

13. An AC-to-DC converter of claim 12, wherein the ramping signal is synchronized to a zero crossing detector of a voltage across the switch.

14. An AC-to-DC converter of claim 12, wherein the ramping signal is synchronized to a zero crossing detector of the AC voltage.

15. An AC-to-DC converter of claim 13 or claim 14, wherein the zero-crossing detector is further comprising: a third comparator to compare a first AC input voltages to a predetermined value; a fourth comparator to compare a second AC input voltage to the predetermined value; and a logic AND gate to determine if both voltages are below the predetermined value; whereby zero-crossing is detected if the output of the AND gate is high.

16. An AC-to-DC converter of claim 13 or claim 14, wherein the zero-crossing detector is further comprising: a summation circuit summing up a first AC input voltage and a second AC input voltage; a third comparator to compare the sum to a predetermined value; whereby zero-crossing is detected if the sum is below the predetermined value.

17. An AC-to-DC converter of claim 12, wherein the ramping signal is a sawtooth signal.

18. An AC-to-DC converter of claim 12, wherein the ramping signal is generated by scaling t the pulsating DC voltage.

19. An AC-to-DC converter of claim 12, further comprising a second regulator coupled between the capacitor and a second load; wherein a minimum of the voltage of the capacitor is controlled equal to the output voltage of the second regulator plus a predetermined headroom voltage.

20. An AC-to-DC converter of claim 19, further comprising: a detector of a peak-to-valley ripple amplitude of the voltage of the capacitor; a summation circuit to determine as the deviation a sum of the output voltage of the second regulator, a predetermined headroom voltage of the second regulator and the peak-to-valley ripple amplitude.

21. An AC-to-DC converter of claim 19, further comprising: a detector to measure a valley value of the voltage of the capacitor; a circuit to determine an error signal as a sum of the output voltage of the second regulator and a predetermined headroom voltage of the second regulator minus the valley value; an amplifier of the error signal; wherein the amplified error signal is the deviation.

* * * * *